US012368463B2

(12) United States Patent
Möhlmann et al.

(10) Patent No.: US 12,368,463 B2
(45) Date of Patent: Jul. 22, 2025

(54) VEHICULAR SYSTEMS INCLUDING DISTRIBUTED ACTIVE ANTENNAS, ADAPTIVE CELLPHONE EVOLUTION, AND/OR INTEGRATED ACCESS AND BACKHAUL

(71) Applicant: Molex, LLC, Lisle, IL (US)

(72) Inventors: Ulrich Möhlmann, Eckental (DE); Nicola Henseler, Herne (DE); Reiner Beck, Eckental (DE); Michael Potts, Lenox Township, MI (US); Robert Sosack, Bartlett, IL (US)

(73) Assignee: Molex, LLC, Lisle, IL (US)

( * ) Notice: Subject to any disclaimer, the term of this patent is extended or adjusted under 35 U.S.C. 154(b) by 323 days.

(21) Appl. No.: 17/866,578

(22) Filed: Jul. 18, 2022

(65) Prior Publication Data

US 2023/0023379 A1    Jan. 26, 2023

Related U.S. Application Data

(60) Provisional application No. 63/224,082, filed on Jul. 21, 2021.

(51) Int. Cl.
*H04B 1/3822*    (2015.01)
*H04B 7/0413*    (2017.01)
*H04W 84/12*    (2009.01)

(52) U.S. Cl.
CPC ......... *H04B 7/0413* (2013.01); *H04B 1/3822* (2013.01); *H04W 84/12* (2013.01)

(58) Field of Classification Search
CPC .... H04B 7/0413; H04B 1/3822; H04W 84/12
See application file for complete search history.

(56) References Cited

U.S. PATENT DOCUMENTS

| 2016/0233974 A1 | 8/2016 | Abramov et al. |
| 2019/0273567 A1* | 9/2019 | Kim ..................... H04B 17/318 |

(Continued)

FOREIGN PATENT DOCUMENTS

| CN | 113099414 A * | 7/2021 | ............... H04B 7/04 |
| JP | 2018518902 A | 7/2018 | |

(Continued)

OTHER PUBLICATIONS

Extended European Search Report and Opinion received for EP Application No. 22186267.5, mailed on Nov. 29, 2022, 9 pages.

*Primary Examiner* — Rahel Guarino

(57) ABSTRACT

Exemplary embodiments are disclosed of vehicular systems including distributed active antennas, adaptive cellphone evolution (e.g., via a smartphone, mobile device, user equipment, etc.) and/or integrated access and backhaul. In exemplary embodiments, a distributed antenna system includes a central unit onboard a vehicle. The central unit includes a transceiver configured to operate in a cellular network. The central unit also includes an analog to digital converter/digital to analog converter coupled to the transceiver. Four active antennas are onboard the vehicle. Each active antenna includes an analog to digital converter/digital to analog converter and is configured to communicate with the central unit digitally. A link connects each of the active antennas to the central unit. The link is configured to transmit signals digitally and support at least 10 Gbps of bandwidth between the central unit and the active antennas.

30 Claims, 14 Drawing Sheets

(56) References Cited

U.S. PATENT DOCUMENTS

2021/0044958 A1  2/2021  Abedini et al.
2021/0120517 A1* 4/2021  Akkarakaran ........ H04W 88/08

FOREIGN PATENT DOCUMENTS

| KR | 20020032346 A | 5/2002 |
|---|---|---|
| KR | 20120097034 A | 9/2012 |
| KR | 101569159 B1 | 11/2015 |
| WO | 2021076796 A1 | 4/2021 |

* cited by examiner

VEHICULAR SYSTEMS INCLUDING DISTRIBUTED ACTIVE ANTENNAS, ADAPTIVE CELLPHONE EVOLUTION, AND/OR INTEGRATED ACCESS AND BACKHAUL

CROSS-REFERENCE TO RELATED APPLICATION

This application claims the benefit of and priority to U.S. Provisional Patent Application Ser. No. 63/224,082 filed Jul. 21, 2021. The entire disclosure of this provisional patent application is incorporated herein by reference.

TECHNICAL FIELD

This disclosure generally relates to vehicular communication and positioning systems including distributed active antennas, adaptive cellphone evolution (e.g., via a smartphone, mobile device, user equipment, etc.) and/or integrated access and backhaul.

DESCRIPTION OF RELATED ART

As motor vehicles become more data driven, the need to communicate with the external world becomes increasingly important. Individuals in vehicles often rely on personal mobile devices for streaming of music, communication with others and even navigation. The motor vehicles themselves can also be in contact with external systems. Such communication allows for over-the-air updates from a central server, information about external conditions relevant to the vehicle through vehicle to everything (V2X) communication, navigational information, sensor sharing, and high accuracy positioning. If the vehicle is intended to have autonomous driving features, then having the ability to provide sensed data to a central server can allow for receipt of improved driving algorithms. Thus, there are numerous reasons for providing data to and from a motor vehicle as well as directly between vehicles, vehicles and vulnerable road users, like pedestrians and cyclists, and vehicles and infrastructure, such as traffic lights.

As vehicles increase the number of antennas, however, this creates a more complicated system. For example, if V2X and regular cellular communication between a vehicle and network is desired, it is likely that two or more antenna systems will be used. These antenna systems have to be mounted in locations that are spaced apart and, for example, one could be mounted toward the front of a vehicle while another was mounted toward the rear of a vehicle. As the operation of the communication system can be important to safety systems in a vehicle, certain individuals would appreciate further improvements in vehicular communication systems.

SUMMARY

This section provides a general summary of the disclosure and is not a comprehensive disclosure of its full scope or all of its features.

Exemplary embodiments are disclosed of vehicular communication systems including distributed active antennas, adaptive cellphone evolution (e.g., via a smartphone, mobile device, user equipment, etc.) and/or integrated access and backhaul.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The present application is illustrated by way of example and not limited in the accompanying figures in which like reference numerals indicate similar elements and in which.

Corresponding reference numerals may indicate corresponding (but not necessarily identical) parts throughout the several views of the drawings.

DETAILED DESCRIPTION OF THE PREFERRED EMBODIMENTS

Figure 1:
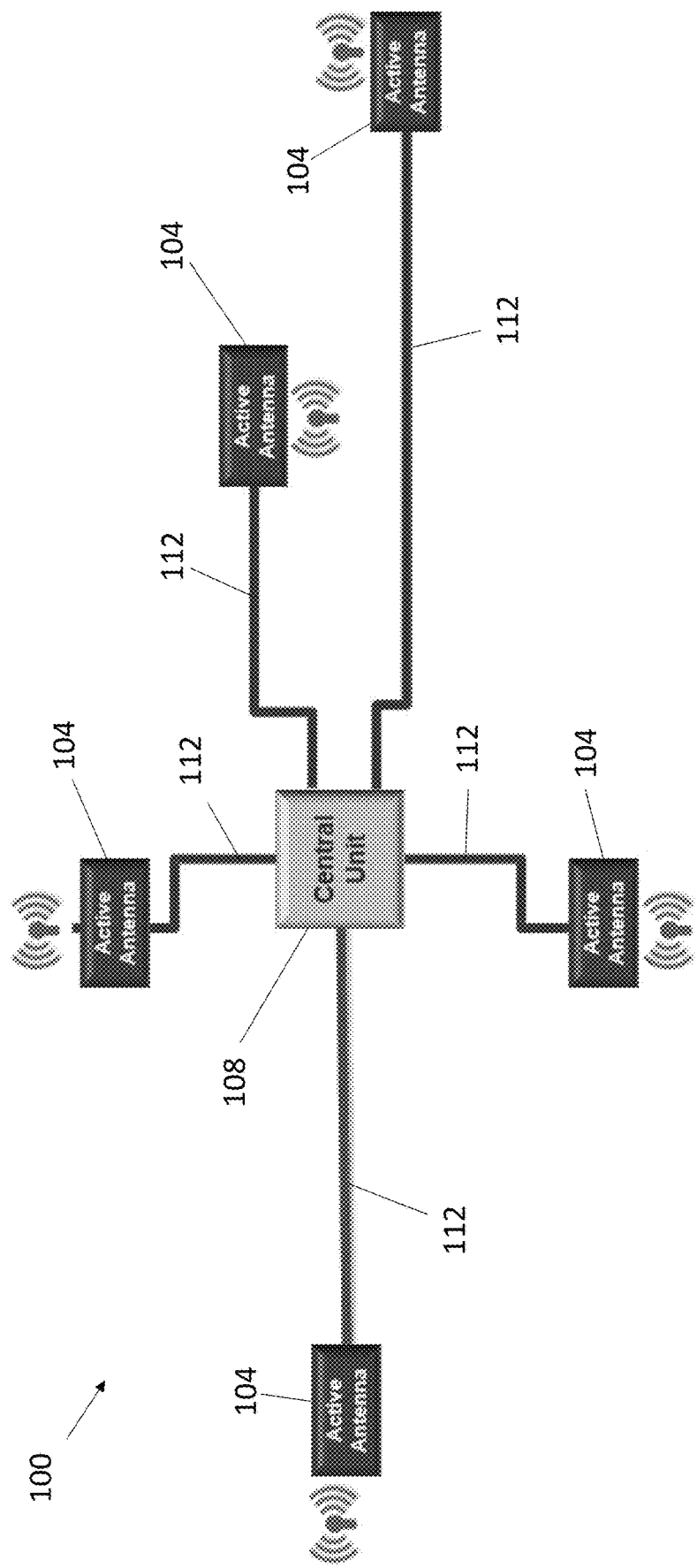
FIG. 1 is a block diagram of a vehicular distributed antenna system (V-DAS) including active antennas connected to a central unit according to an exemplary embodiment.
Figure 2:
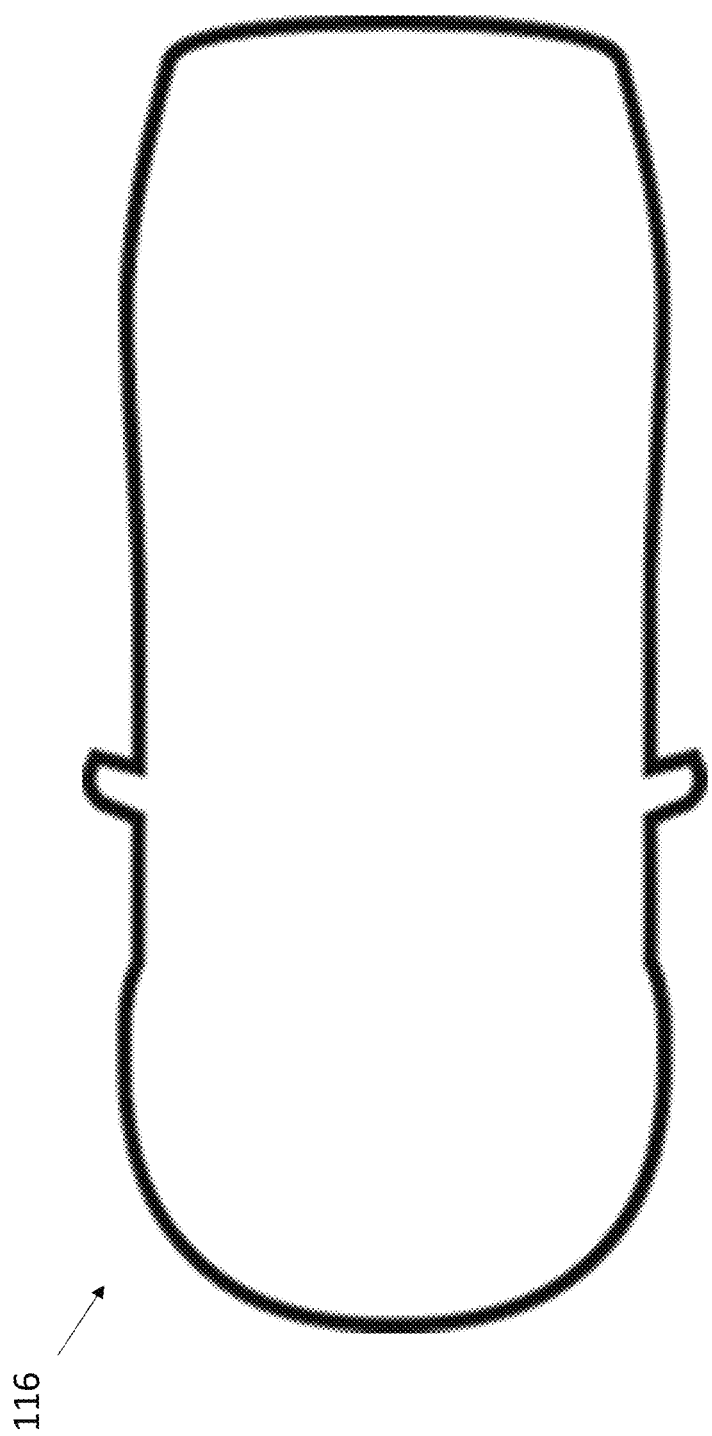
FIG. 2 illustrates an example vehicle in which may be installed the vehicular distributed antenna system shown in FIG. 1 according to an exemplary embodiment.

The detailed description that follows describes exemplary embodiments and the features disclosed are not intended to be limited to the expressly disclosed combination(s). Therefore, unless otherwise noted, features disclosed herein may be combined together to form additional combinations that were not otherwise shown for purposes of brevity.

As recognized herein for 5G enhanced mobile broadband (eMBB) and ultra-reliable low-latency communication (URLLC), MIMO (Multiple Input Multiple Output) requires a mandatory minimum of four antennas that are strongly decoupled via a minimum distance of separation that is 10× wavelength. For example, the minimum distance of separation of the four antennas is 12 meters for 1 GHz, which is calculated as follows: 0.3 meter wavelength at 1 GHz×10×4 antennas=12 meters. As another example, the minimum distance of separation of the four antennas is 3.4 meters for 3.5 GHz, which is calculated as follows: 0.085 meter wavelength at 3.5 GHz×10×4 antennas=3.4 meters. While FR2/mmWave provides sufficient RF bandwidth, line of sight (LOS) is needed between the transmitter and receiver such that several antennas must be distributed around the vehicle.

As recognized herein for LTE/NR-V2X at 5.9 GHz, connectivity to other vehicles, pedestrians, and infrastructure (e.g., traffic lights, etc.) requires 180/360 degree hemispherical coverage such that several antennas must be distributed around the vehicle.

As recognized herein for a distributed antenna system (DAS), links between the distributed antennas and the central unit (CU) are routed inside the vehicle with a maximum length of 15 meters. Analog links suffer from huge losses especially at higher frequencies as the higher the frequencies, the higher the losses. Digital links with zero loss are data bandwidth dependent with analog to digital (A/D) and digital to analog (D/A) conversion, time synchronization (within single digit nanoseconds), and data compression at the antenna site.

The central unit must be frequently updated, e.g., about every 1.5 to 2 years when a new 3GPP release is fixed which is implemented in software in the infrastructure including the base stations (cell towers). For the handsets, new silicon systems on a chip (SoCs) are implemented because of size, power consumption, and heat generation. Wireless Communication Generation is evolving about every 10 years with a new evolved air interface (e.g., Long Term Evolution (LTE) in 2010, 5G New Radio (NR) in 2020, etc.) with backward compatibility, which needs new hardware including antennas and RF frontends both in the infrastructure as well as in the handsets.

For vehicles, it may make sense to adopt the infrastructure software implementation when considered from a live time point of view and a size and battery point of view if costs were not an issue. But the initial cost would be very high/cost prohibitive for a high performance processing platform that has the capability of running software updates for one 10 year generation, which would equate to 5×2 years of 3GPP release software updates. As disclosed herein, an alternative option is to use a new handset (e.g., smartphone, other user equipment (UE), etc.) every two years as a network access device (NAD). The new handset is connectible to the DAS active antenna links and switches from the handset's internal less performant antennas to the external DAS antennas. After the switch, the handset is then useable as a central unit of the vehicular distributed antenna system. The switch may be implemented in the silicon (SoC) of the handset. And, using a new handset every two years as a network access device (NAD) in a vehicular distributed antenna system may eliminate the need to update the software of a baseband modem for each new 3GPP release software update(s).

After recognizing the above, exemplary embodiments of vehicular communication systems were developed and/or are disclosed herein that may address issues and/or meet technical specifications for vehicular communications noted above. In exemplary embodiments, a vehicular communication system may include distributed active antennas, adaptive cellphone evolution (e.g., smartphone, mobile device, user equipment, etc.) and/or integrated access and backhaul.

With reference to the figures, FIG. 1 illustrates an exemplary embodiment of a vehicular distributed antenna system (V-DAS) 100 including active antennas 104 connected to a central unit 108 via links 112. Although the vehicular distributed antenna system 100 is illustrated with five active antennas 104, exemplary embodiments disclosed herein may include more or less than five active antennas, e.g., depending on the configuration of the vehicle (e.g., vehicle type, size, shape, etc.) in which the vehicular distributed antenna system will be installed. It should be noted that the links 112 are shown as separate from each other in FIG. 1. In an embodiment the links 112 can be a single shared communication network or each link can be partially or fully dedicated to a communication channel between the corresponding active antenna 104 and the central unit 108.

Figure 3:
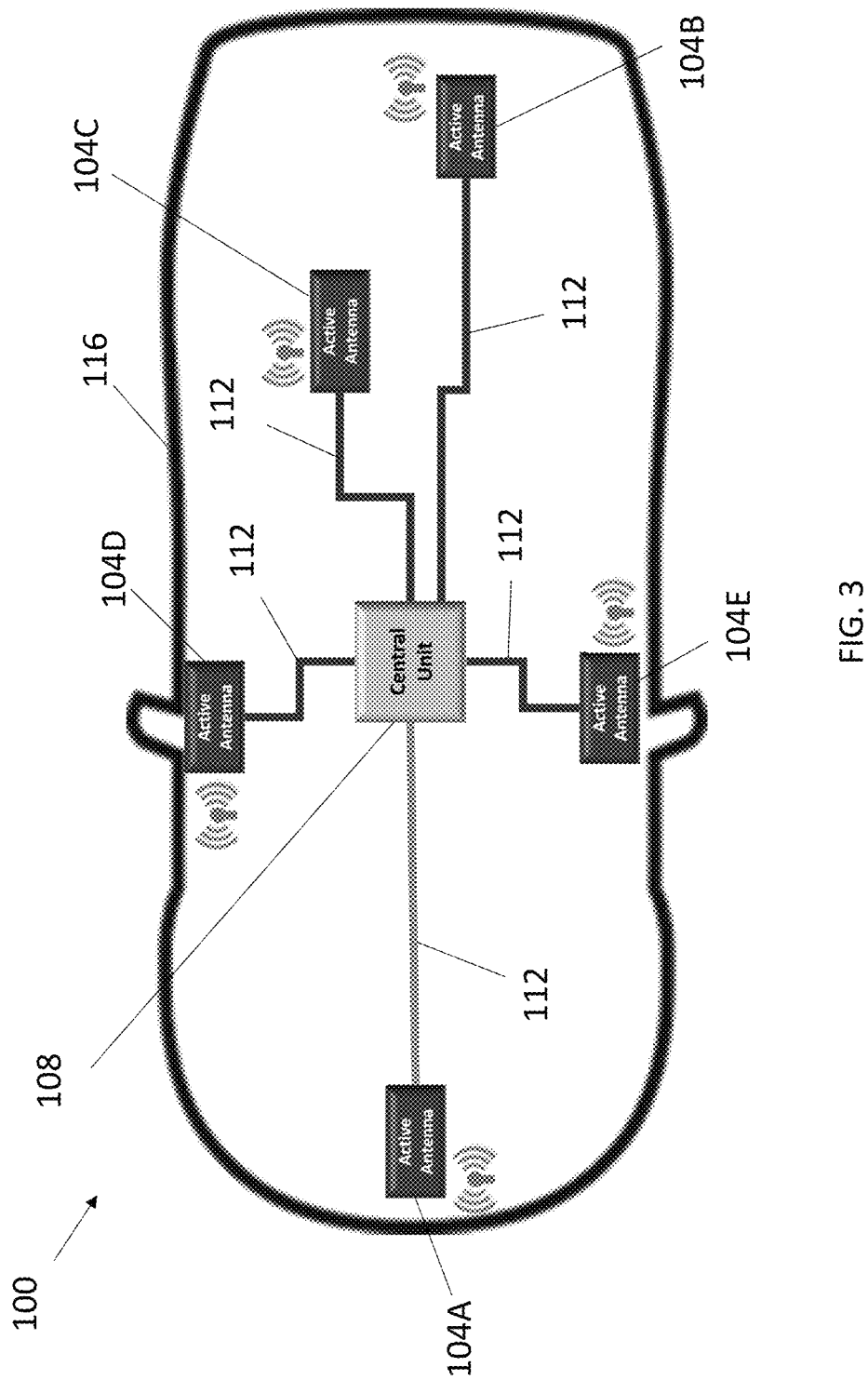
FIG. 3 illustrates the vehicular distributed antenna system shown in FIG. 1 installed within the example vehicle shown in FIG. 2 according to an exemplary embodiment in which the vehicular distributed antenna system is operable for providing 180/360 degree hemispherical coverage.

As shown in FIG. 3, the vehicular distributed antenna system 100 is installed in a vehicle 116, such that the active antennas 104 are spaced apart from each other and distributed around the vehicle 116. More specifically, the active antenna 104A is located towards the front of the vehicle 116, e.g., on the vehicle hood. The active antenna 104B is located towards the back of the vehicle 116, e.g., on the vehicle trunk. The active antenna 104C is located on top of the vehicle 116, e.g., on the vehicle roof. The active antennas 104D and 104E are respectively located along the passenger and driver sides of the vehicle 116, e.g., on the side view mirrors. By distributing the active antennas 104 around the vehicle 116, the vehicular distributed antenna system 100 is operable for providing 180/360 degree hemispherical coverage, e.g., including 5G eMBB/URLLC and V2X/RF BW MIMO, etc.

In this exemplary embodiment, the links 112 between the active antennas 104 and the central unit 108 are digital links with relatively high bandwidth, e.g., that are suitable for 5G eMBB/URLLC, V2X/RF BW MIMO, 25 GB Automotive Ethernet, etc. In other embodiments, the links 112 may comprise 10 GB-Ethernet digital links or other digital links higher or lower than 10 GB, etc.

Figure 4:
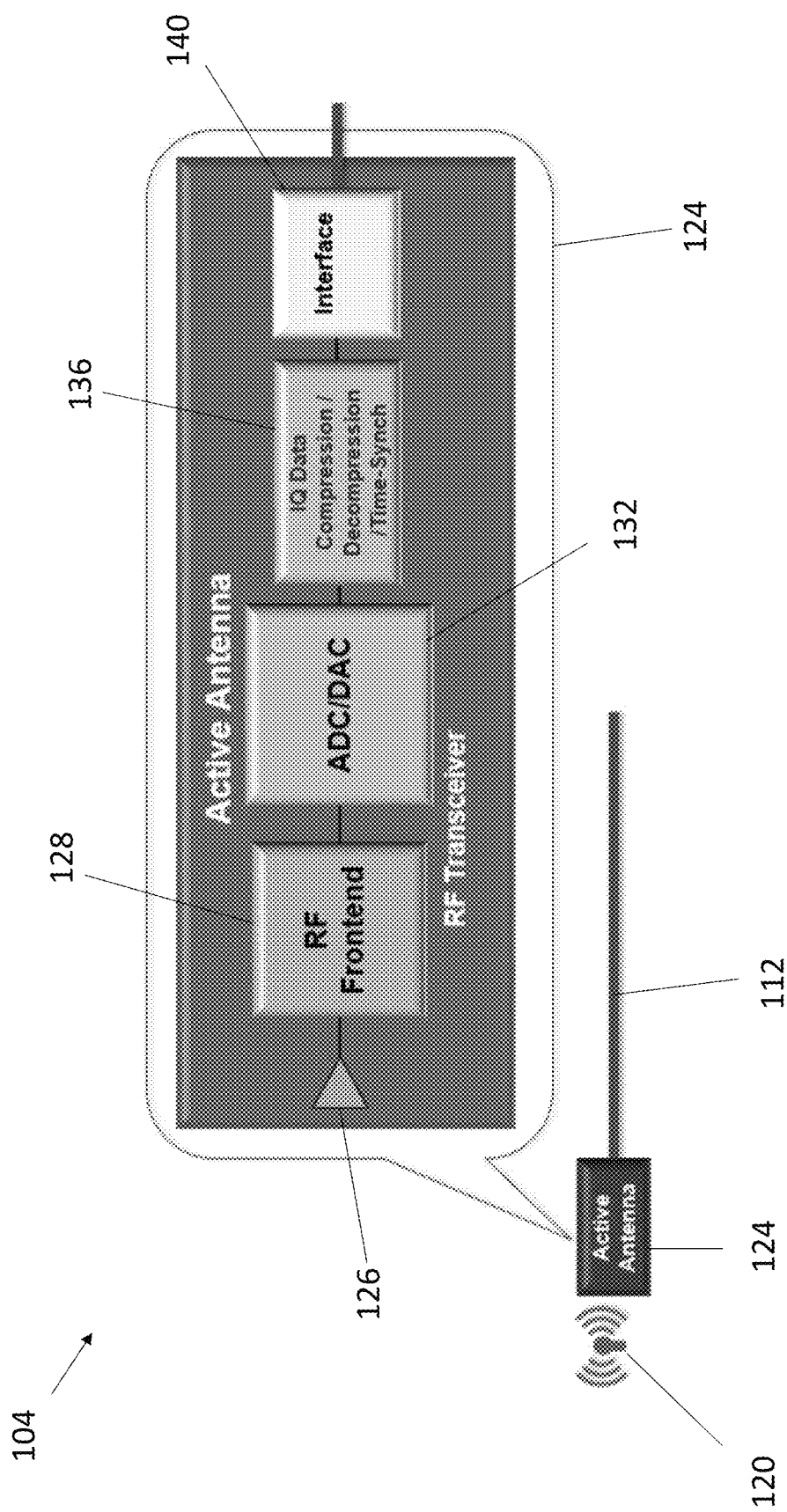
FIG. 4 is a block diagram of an active antenna that may be used in a vehicular distributed antenna system according to exemplary embodiments.

FIG. 4 illustrates an active antenna 104 that may be used in a vehicular distributed antenna system according to exemplary embodiments. For example, the active antenna 104 may be used in the vehicular distributed antenna system 100 shown in FIGS. 1 and 3. In which case, each of the five active antennas 104 of the vehicular distributed antenna system 100 may be identical to each other and include the components as shown in FIG. 4. Accordingly, the five active antennas 104 of the vehicular distributed antenna system 100 will be described together for brevity with reference to FIG. 4.

As shown in FIG. 4, the active antenna 104 includes an antenna 120 and an active antenna electronic 124. The active antenna electronic 124 includes an antenna connectivity 126, as part of the RF front end module (FEM) 128, an analog to digital converter/digital to analog converter (ADC/DAC) 132, IQ Data Compression/Decompression and Time Synchronization module 136 (e.g., algorithms, etc.), and a high speed digital link interface 140 (e.g., 10 GB-Ethernet interface, 25 GB-Ethernet interface, etc.). The RF front end module (FEM) 128 may include a power amplifier for transmission and a low-noise amplifier for reception.

Figure 5:
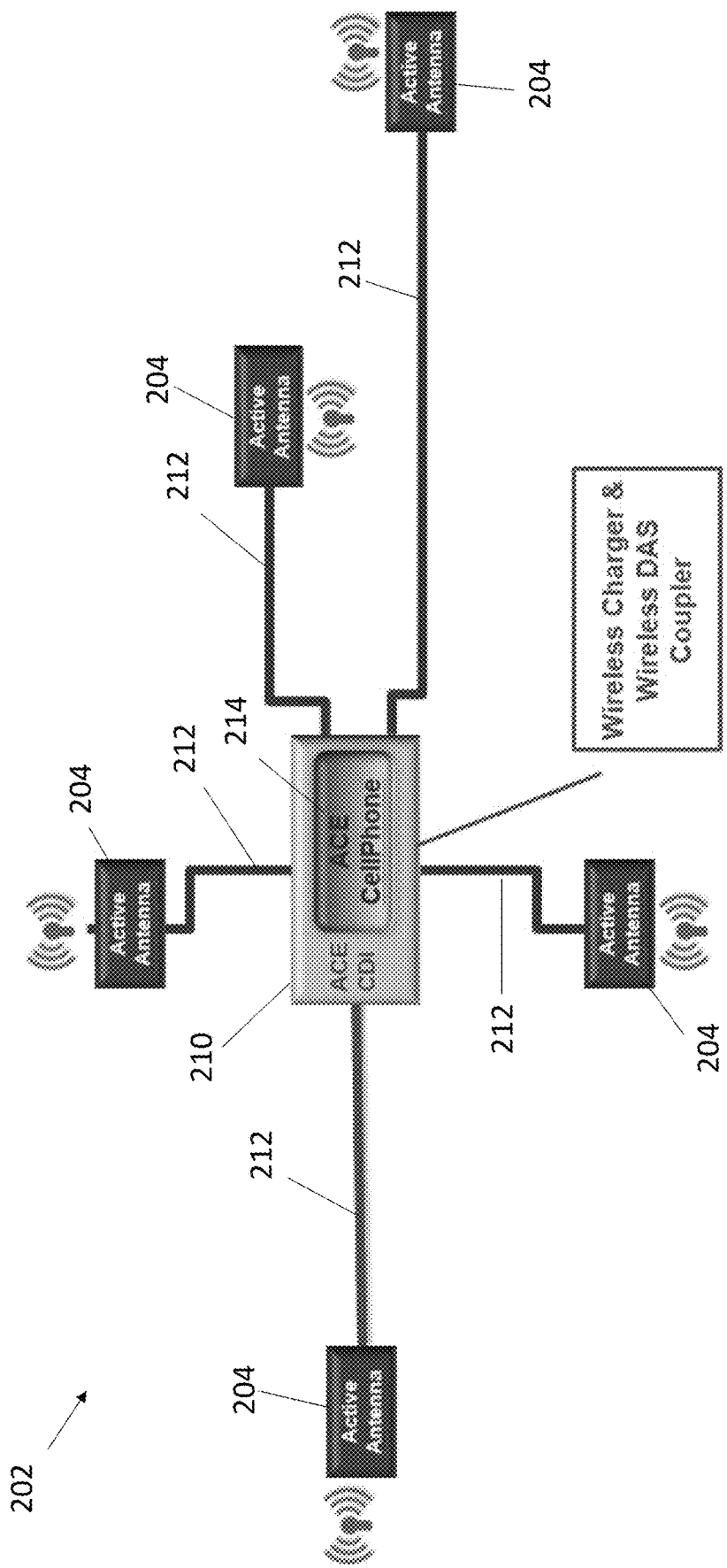
FIG. 5 is a block diagram of a vehicular distributed antenna system (V-DAS) including active antennas connected to a wireless charger and wireless DAS coupler and a cellphone (e.g., smartphone, etc.) configured with adaptive cellphone evolution (ACE) according to an exemplary embodiment.

FIG. 5 illustrates an exemplary embodiment of a vehicular distributed antenna system (V-DAS) 202 including active antennas 204 connected to a wireless charger & wireless DAS coupler 210 and a cellphone 214 (e.g., smartphone, etc.) configured with adaptive cellphone evolution (ACE). The wireless charger & wireless DAS coupler 210 (broadly, a central unit or device) is connected to the active antennas 204 via the links 212. The wireless charger & wireless DAS coupler 210 is also connected to the cellphone 214 (broadly, a mobile device or user equipment) via a customer device interface (CDI), which is the wireless charger & wireless DAS coupler 210 (e.g., by means of mmWave or other high-speed wireless technologies). Accordingly, the cellphone 214 is therefore coupled with the active antennas 204 via the wireless charger & wireless DAS coupler 210 and the links 212.

Figure 6:
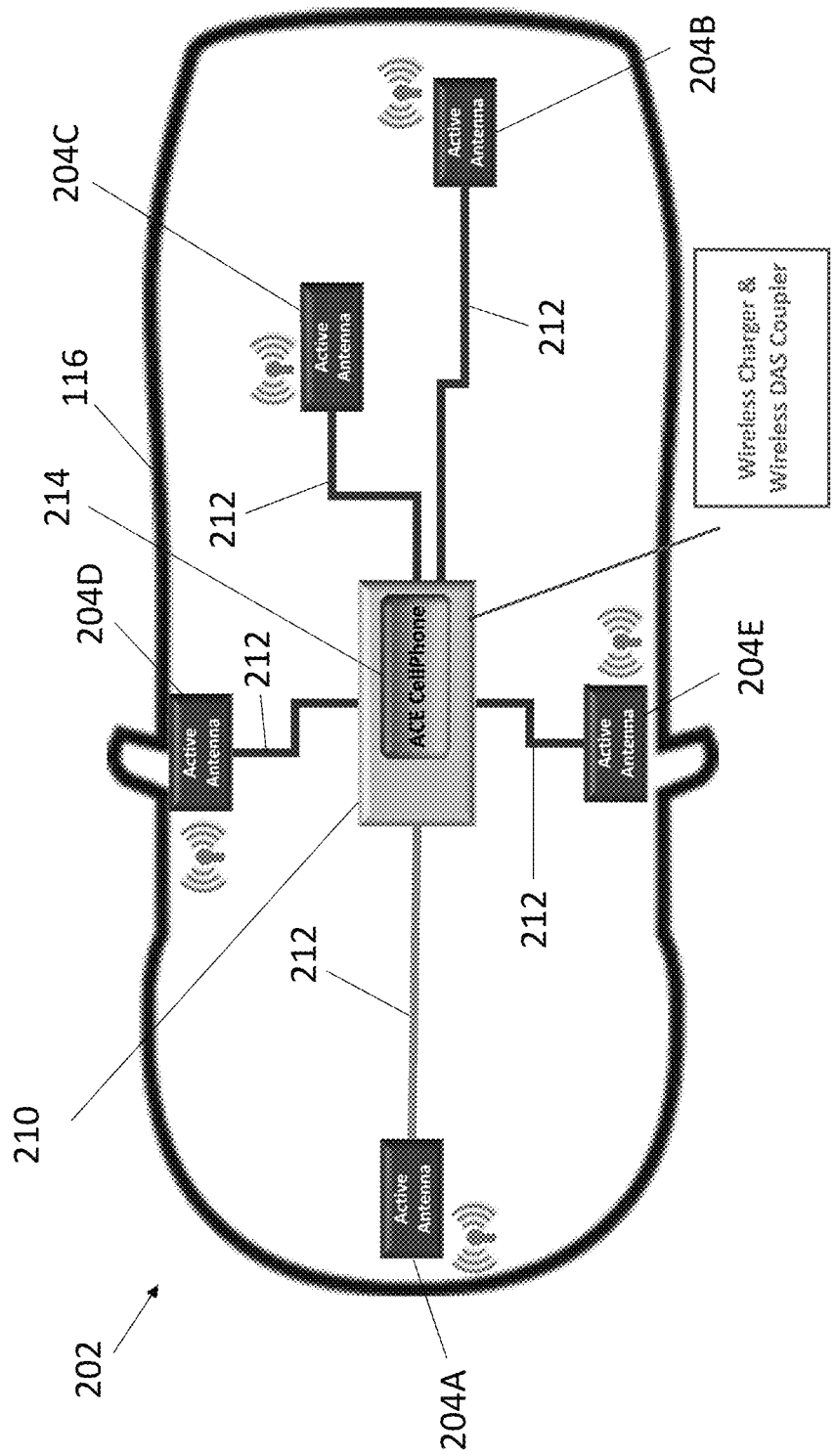
FIG. 6 illustrates the vehicular distributed antenna system shown in FIG. 5 installed within the example vehicle shown in FIG. 2 according to an exemplary embodiment.

As shown in FIG. 6, the vehicular distributed antenna system 202 is installed in a vehicle 116, such that the active antennas 204 are spaced apart from each other and distributed around the vehicle 116. More specifically, the active antenna 204A is located towards the front of the vehicle 116, e.g., on the vehicle hood. The active antenna 204B is located towards the back of the vehicle 116, e.g., on the vehicle trunk. The active antenna 204C is located on top of the vehicle 116, e.g., on the vehicle roof. The active antennas 204D and 204E are respectively located along the passenger and driver sides of the vehicle 116, e.g., on the side view mirrors. By distributing the active antennas 204 around the vehicle 116, the vehicular distributed antenna system 202 is operable for providing 180/360 degree hemispherical coverage, e.g., including 5G eMBB/URLLC and V2X/RF BW MIMO, etc.

In this exemplary embodiment, the links 212 between the active antennas 204 and the wireless charger 210 are digital links with relatively high bandwidth, e.g., that are suitable for 5G eMBB/URLLC, V2X/RF BW MIMO, 25 GB Automotive Ethernet, etc. In other embodiments, the links 212 may comprise 10 GB-Ethernet digital links or other digital links higher or lower than 10 GB, etc.

Figure 7:
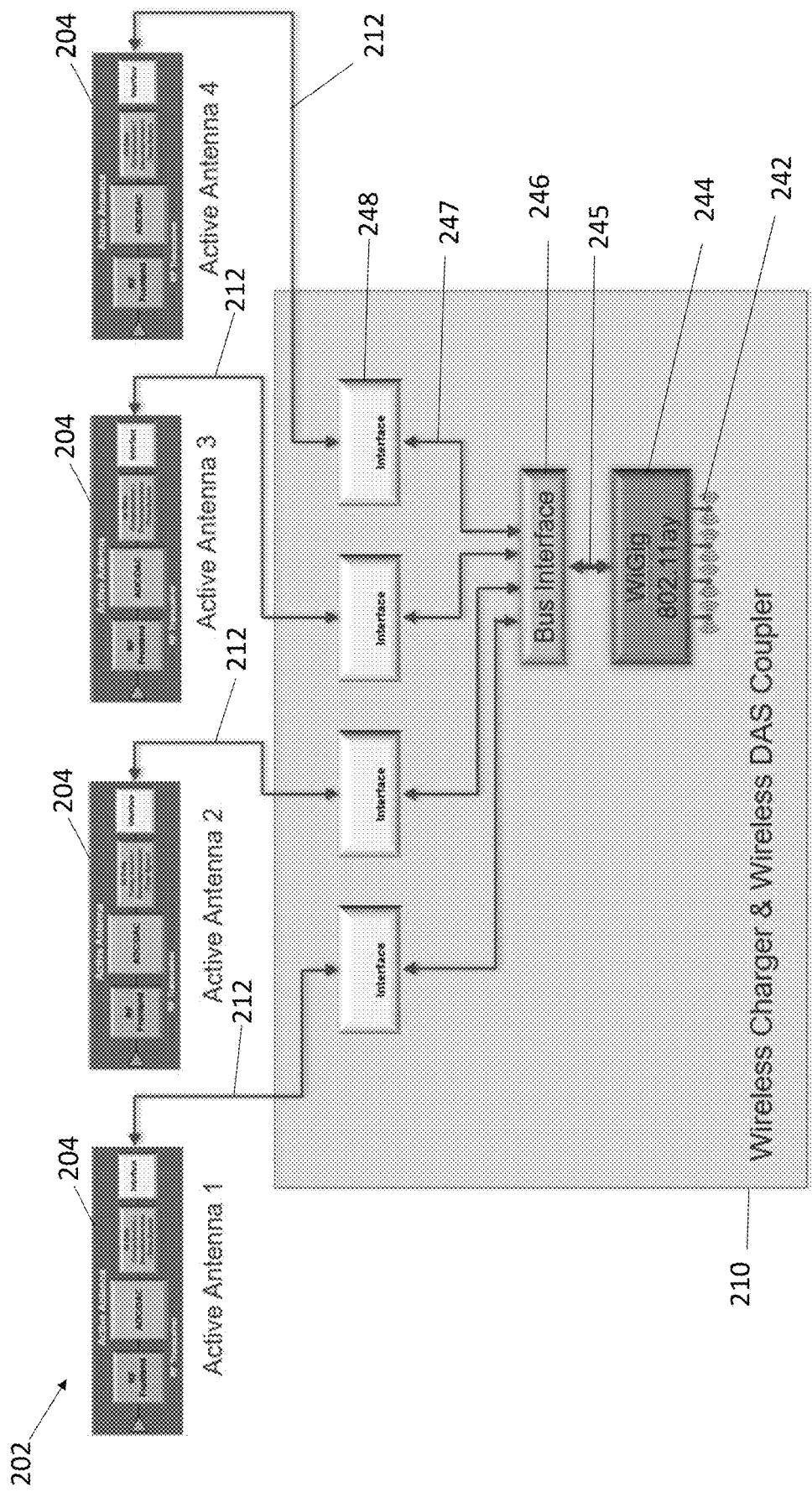
FIG. 7 is a block diagram of a vehicular distributed antenna system, and illustrating components of the active antennas and components of a wireless DAS coupler according to an exemplary embodiment.

The active antennas 204 shown in FIGS. 5, 6, and 7 may be identical to the active antenna 104 described above and shown in FIG. 4. In which case, each active antenna 204 may also include an antenna 120 and an active antenna electronic 124 as shown in FIG. 4. The active antenna electronic 124 includes an antenna connectivity 126, as part of the RF front end module (FEM) 128, an analog to digital converter/digital to analog converter (ADC/DAC) 132, IQ Data Compression/Decompression and Time Synchronization module 136 (e.g., algorithms, etc.), and a high speed digital link interface 140 (e.g., 10 GB-Ethernet interface, 25 GB-Ethernet interface, etc.). The RF front end module (FEM) 128 may include a power amplifier for transmission and a low-noise amplifier for reception.

FIG. 7 illustrates components of the active antennas 204 and components of the wireless DAS coupler of the wireless charger & wireless DAS coupler 210. As shown, the wireless DAS coupler includes a plurality of internal antennas 242, a WiGig 802.11ay 244, a bus interface 246, and high speed digital link interfaces 248. The bus interface 246 is connected with the WiGig 802.11ay 244 via a link 245. The bus interface 246 is also connected with the high speed digital link interfaces 248 via links 247.

Each high speed digital link interface 248 of the wireless DAS coupler is connected via a link 212 to a high speed digital link interface of a corresponding active antenna 204. After the wireless DAS coupler is connected to the active antennas 204, the wireless DAS coupler may be usable as a central unit of the vehicular distributed antenna system 202.

In this exemplary embodiment, the active antennas 204 are operable for providing 180/360 degree hemispherical coverage, e.g., including 5G eMBB/URLLC and V2x/RF BW MIMO, etc. The wireless DAS coupler's internal antennas 242 (e.g., WiGig antennas for 60 GHz band for up to 7 Gbps wireless communication, etc.) are operable for providing wireless vehicular connectivity (e.g., Wi-Fi, 5G, mmWave, WiGig, etc.), e.g., even while a smartphone is being charged by the wireless charger & wireless DAS coupler 210, etc.

Although FIGS. 5, 6, and 7 illustrate the vehicular distributed antenna system 202 including the wireless charger & wireless DAS coupler 210, other exemplary embodiments of a vehicular distributed antenna system may include a device having a DAS coupler that is not a wireless charger. Accordingly, the vehicular distributed antenna systems disclosed herein should not be limited to use with only wireless chargers that include wireless DAS couplers.

FIG. 7 illustrates the wireless DAS coupler including WiGig antennas 242 and WiGig 802.11ay 244, but exemplary embodiments disclosed herein are not limited to only WiGig or 60 GHz Wi-Fi frequencies. Alternative embodiments may include DAS couplers configured to be operable with other wireless frequencies, e.g., including frequencies higher or lower than 60 GHz, etc.

Figure 8:
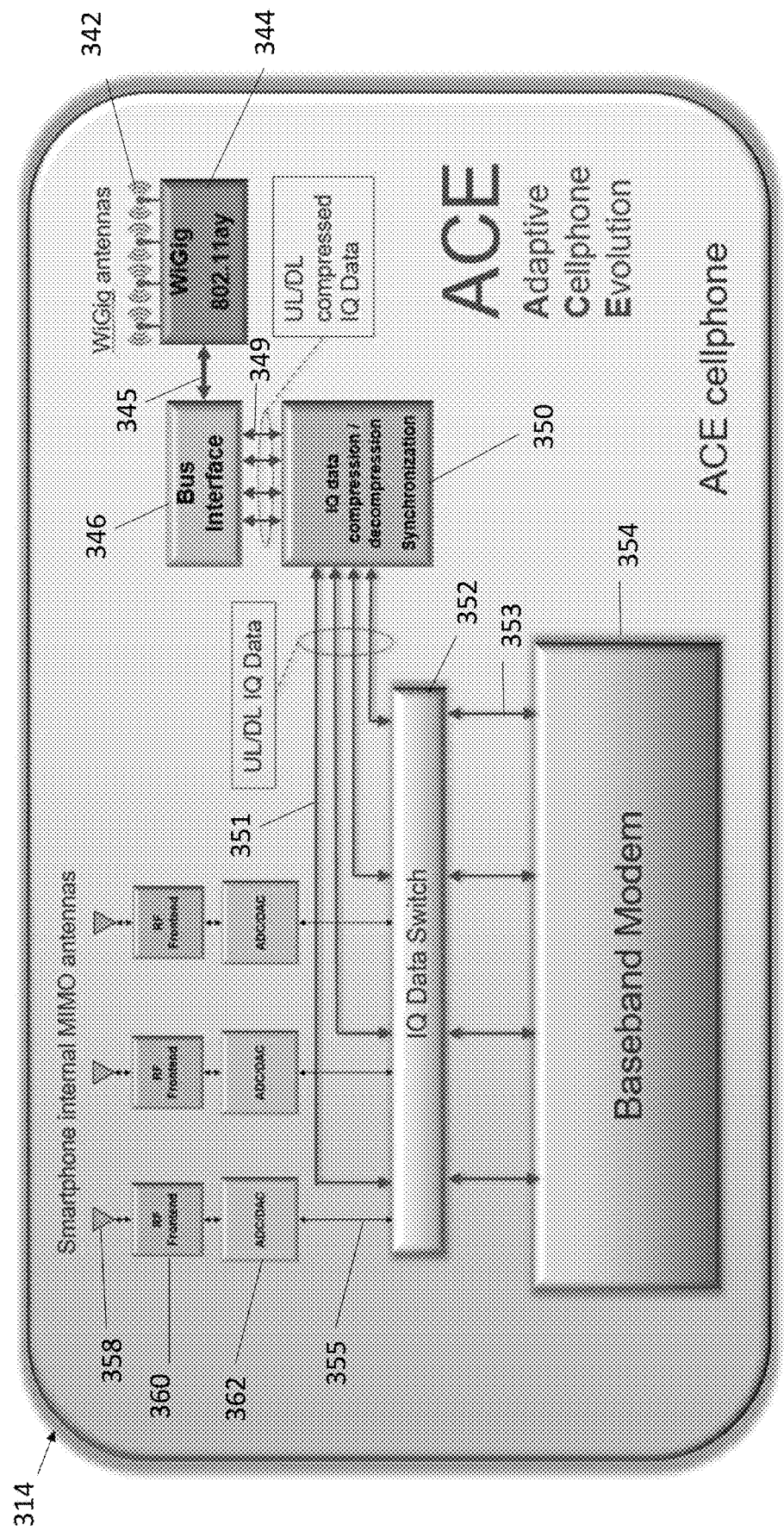
FIG. 8 is a block diagram of a smartphone or cellphone (broadly, user equipment (UE)) configured with adaptive cellphone evolution (ACE) for use in a vehicular distributed antenna system according to an exemplary embodiment.

FIG. 8 illustrates components of a smartphone or cellphone 314 (broadly, a mobile device or user equipment (UE)) configured with adaptive cellphone evolution (ACE) for use in a vehicular distributed antenna system according to an exemplary embodiment. For example, the smartphone 314 may be used with active antennas 104 (FIGS. 1, 3, 4) or active antennas 204 (FIGS. 5, 6 and 7) that are distributed around a vehicle.

The smartphone 314 includes internal WiGig antennas 342, a WiGig 802.11ay 344, and a bus interface 346. The bus interface 346 is connected with the WiGig 802.11ay 344 via a link 345.

The smartphone 314 also includes IQ data compression/decompression and synchronization module 350 (e.g., algorithms, etc.) for UL/DL (uplink/downlink) IQ data transmitted/received by the smartphone's internal WiGig antennas 342. UL/DL compressed IQ data is transmittable between the bus interface 346 and the module 350 via links 349. UL/DL IQ data is transmitted between the module 350 and an IQ data switch 352 via links 351.

The IQ data switch 352 is in communication with a baseband modem 354 via links 353. The IQ data switch 352 is also in communication with the smartphone internal MIMO antennas 358 via links 355. The smartphone 314 further includes a RF front end module (FEM) 360 and analog to digital converter/digital to analog converter (ADC/DAC) 362 between the MIMO antennas 358 and IQ data switch 352.

The smartphone 314 is connectible to DAS active antenna links (e.g., links 112 (FIGS. 1, 3, 4) or link 212 (FIGS. 5, 6, 7), etc.). The smartphone 314 is configured to switch from its internal less performant antennas 358 to the external DAS antennas (e.g., active antennas 104 or 204, etc.). After the switch, the smartphone 314 is also useable as the central unit for the vehicular distributed antenna system as a network access device (NAD) function. The switch may be implemented in the silicon (SoC) of the smartphone 314. Using a new smartphone 314 every two years as the central unit for the vehicular distributed antenna system as a network access device (NAD) function may eliminate the need to update the software of a baseband modem for each new 3GPP release software update(s).

Although FIG. 8 illustrates WiGig antennas 342 and WiGig 802.11ay 344, exemplary embodiments disclosed herein are not limited to only WiGig or 60 GHz Wi-Fi frequencies. Alternative embodiments may include cellphones or smartphones configured to be operable with other wireless frequencies, e.g., including frequencies higher or lower than 60 GHz, etc.

Figure 9:
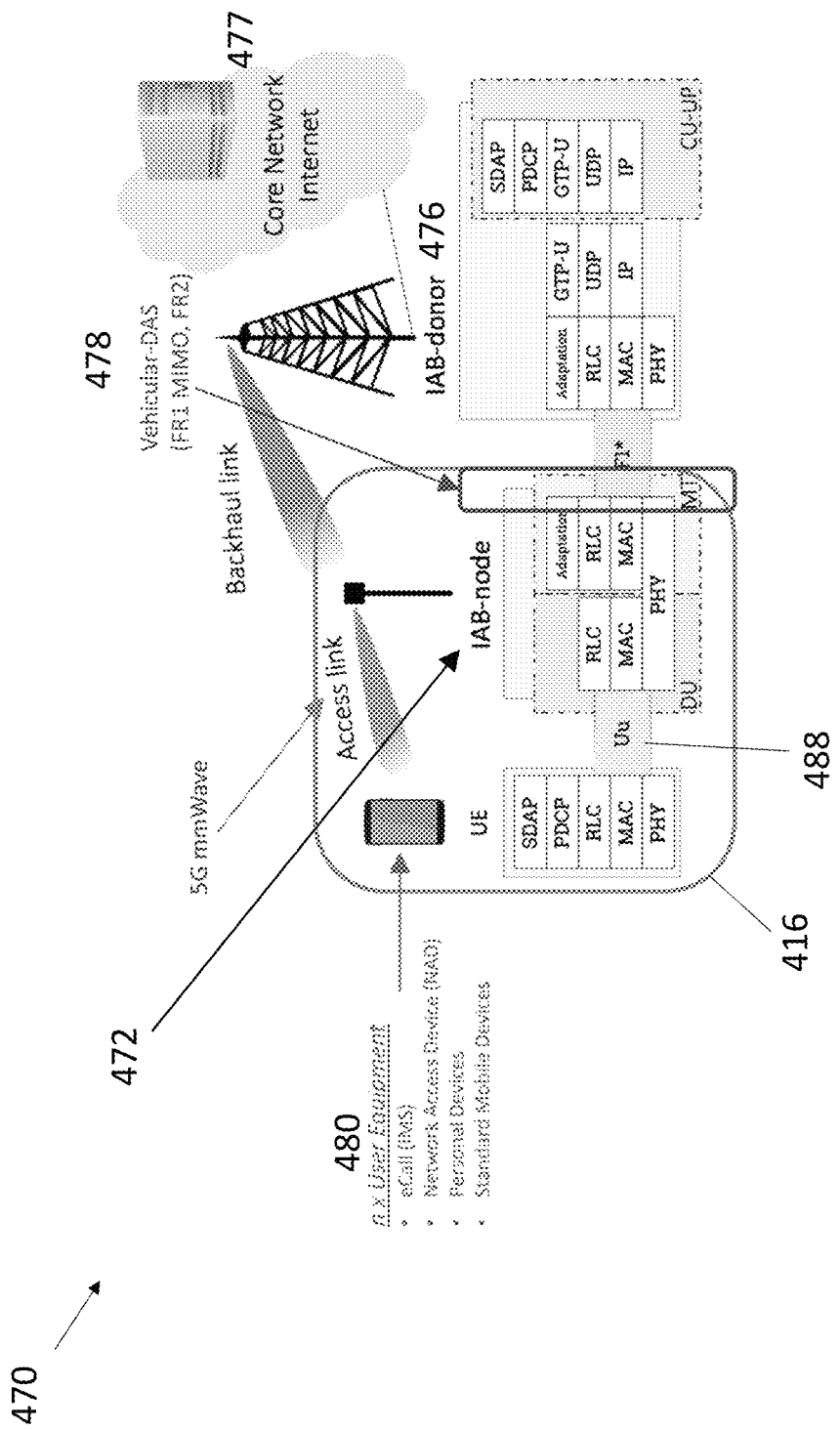
FIG. 9 illustrates a protocol stack and architecture of a vehicular integrated access and backhaul (V-IAB) node as part of the entire network according to an exemplary embodiment.

FIG. 9 illustrates a protocol stack and architecture of a vehicular integrated access and backhaul (V-IAB) node 472 as part of an entire network 470 according to an exemplary embodiment. The vehicular IAB node 472 is onboard a vehicle 416. By way of example, the vehicular IAB node 472 may be part of or included within a central unit of a vehicular distributed antenna system. Or, for example, the vehicular IAB node 472 may be a standalone or separate device that is not part of a central unit of a vehicular distributed antenna system.

The vehicular IAB node 472 is connectible to an IAB-donor 476 (or an upstream IAB-node) via F1*interface running over the wireless backhaul link between the mobile termination (MT) in the vehicular IAB node 472 and the upstream central unit (CU-UP) in the IAB-donor 476. The IAB-donor 476 is connected with the core network internet 477.

The vehicular IAB node 472 is also connectible to a vehicular distributed antenna system 478. As disclosed herein, the vehicular distributed antenna system 478 may include active antennas (e.g., active antennas 104 (FIGS. 1, 3, 4) or active antennas 204 (FIGS. 5, 6, 7), etc.) distributed around the vehicle for providing 180/360 degree hemispherical coverage, e.g., including FR1 MIMO, FR2 mmWave, etc.

The vehicular IAB node 472 is connectible to user equipment (UE) 480 via the Uu interface 488 between the user equipment 480 and the distributed unit (DU) in the vehicular IAB node 472. The user equipment 480 may comprise one or more of a smartphone, eCall modem IMS (IP Multimedia Subsystem), a network access device (NAD), a personal device, a standard mobile device, etc.

The network 470 may be operable for providing 5G URLL and eMBB FR1 (below 7 GHz) via vehicular-IAB backhaul F1*outside the vehicle to the network(s). The network 470 may also be operable for providing 5G URLL and eMBB FR2 (mmWave) connectivity inside the vehicle 416 for the user equipment 480, including one or more standard mobile devices functioning as a network access device (NAD), eCall-Modem (IMS Version), multiple driver and passenger personal devices, etc.

The relatively low power 5G URLL and eMBB FR2 (mmWave) preferably does not extend outside the vehicle 416 and does not interfere with or couple with any external DAS active antennas. The wireless connectivity provided directly through the IAB node may be usable by standard user equipment, e.g., a standard smartphone without requiring a software upgrade, etc. The network 470 may provide FR1 Best-In-Class-MIMO outside the vehicle to FR2 Large RF Bandwidth inside the vehicle.

Figure 10:
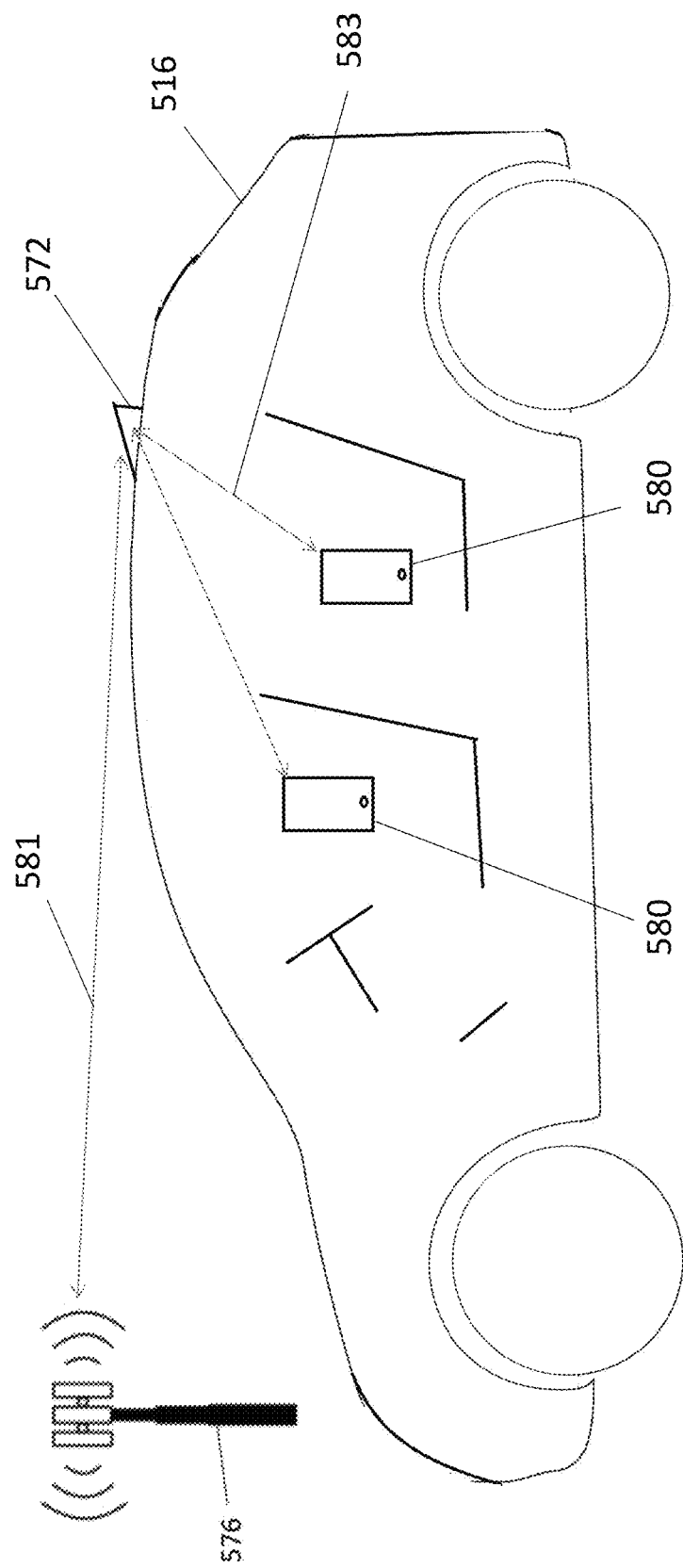
FIG. 10 illustrates an example vehicle including a vehicular IAB node (combined radio unit (RU) and distributed unit (DU)) of a vehicle integrated access and backhaul (V-IAB) network connecting UEs inside the vehicle according to an exemplary embodiment.

FIG. 10 illustrates an example vehicle 516 including a vehicular IAB node 572 (combined radio unit (RU) and distributed unit (DU)) of a vehicle integrated access and backhaul (V-IAB) network connecting UEs 580 inside the vehicle 516 according to an exemplary embodiment. The vehicular IAB node 572 is in communication with an IAB-donor or upstream IAB node 576 via backhaul F1 over Uu links 581. The vehicular IAB node 572 is also in communication via Uu links 583 with smartphones 580 (broadly, user equipments (UEs)) within the vehicle 516.

Generally, the radio unit (RU) handles the digital front end (DFE) parts of the physical layer (PHY) layer, and digital beamforming functionality. The distributed unit (DU) runs the radio link control (RLC) layer, media access control (MAC) layer, and parts of the PHY layer. The operation of the distributed unit (DU) may be controlled by a centralized unit (CU), which runs the radio resource control (RRC) layer and packet data convergence protocol (PDCP) layer.

Figure 11A:
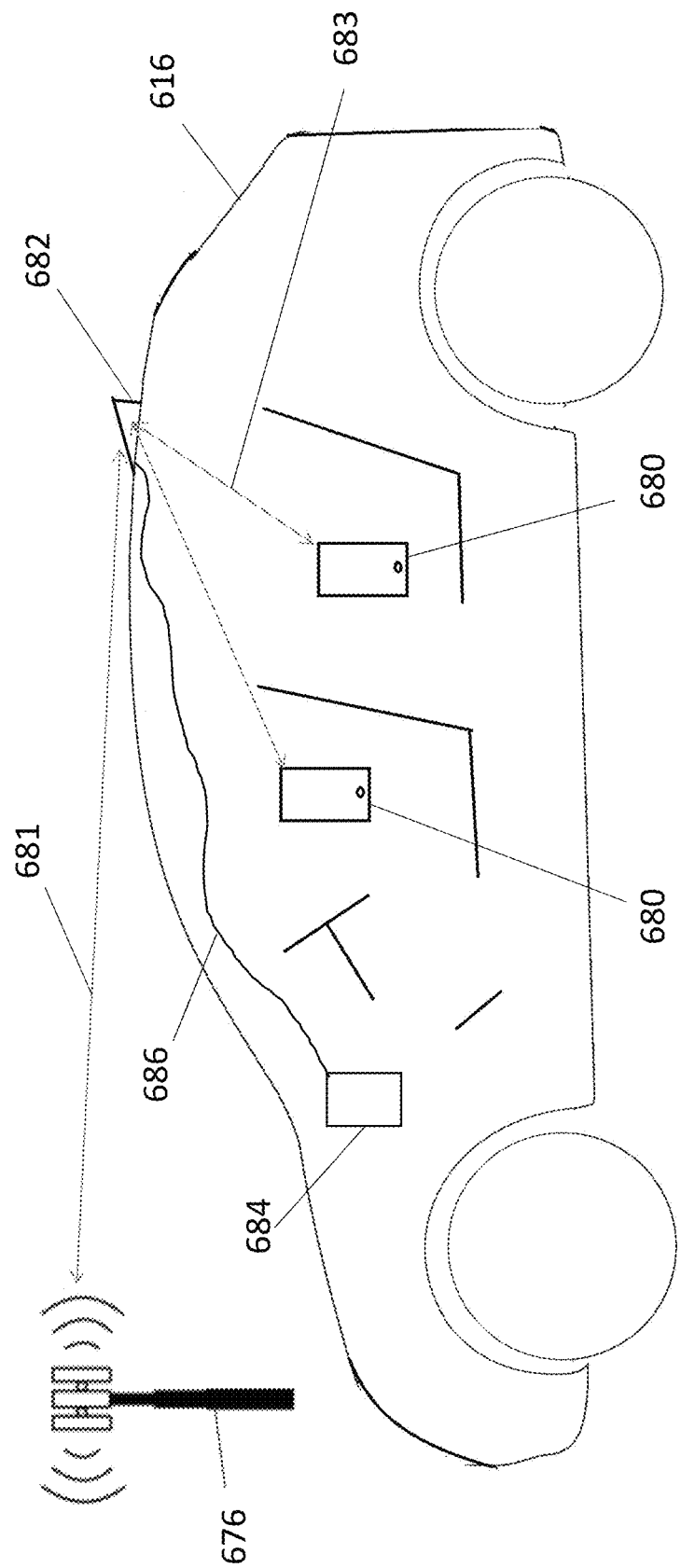
FIG. 11A illustrates an example vehicle including a split vehicular IAB node (separated radio unit (RU)) and distributed unit (DU) connected by a digital link) of a vehicle integrated access and backhaul (V-IAB) network connecting UEs inside the vehicle according to an exemplary embodiment.

FIG. 11A illustrates an example vehicle 616 including a split vehicular IAB node (separated radio unit (RU) 682 and distributed unit (DU) 684) of a vehicle integrated access and backhaul (V-IAB) network according to an exemplary embodiment. The radio unit (RU) 682 and distributed unit (DU) 684 of the split vehicular IAB node are connected via a digital link 686 (e.g., via fronthaul (FH) O-RAN Split 7.2X network interface and 25 GB-Ethernet, etc.).

The radio unit (RU) 682 of the split vehicular IAB node is in communication with an IAB-donor or upstream IAB node 676 via backhaul F1 over Uu link 681. The radio unit (RU) 682 of the split vehicular IAB node is also in communication via Uu links 683 with smartphones 680 (the one or more mobile devices can be considered user equipment (UE)) within the vehicle 616.

Figure 11B:
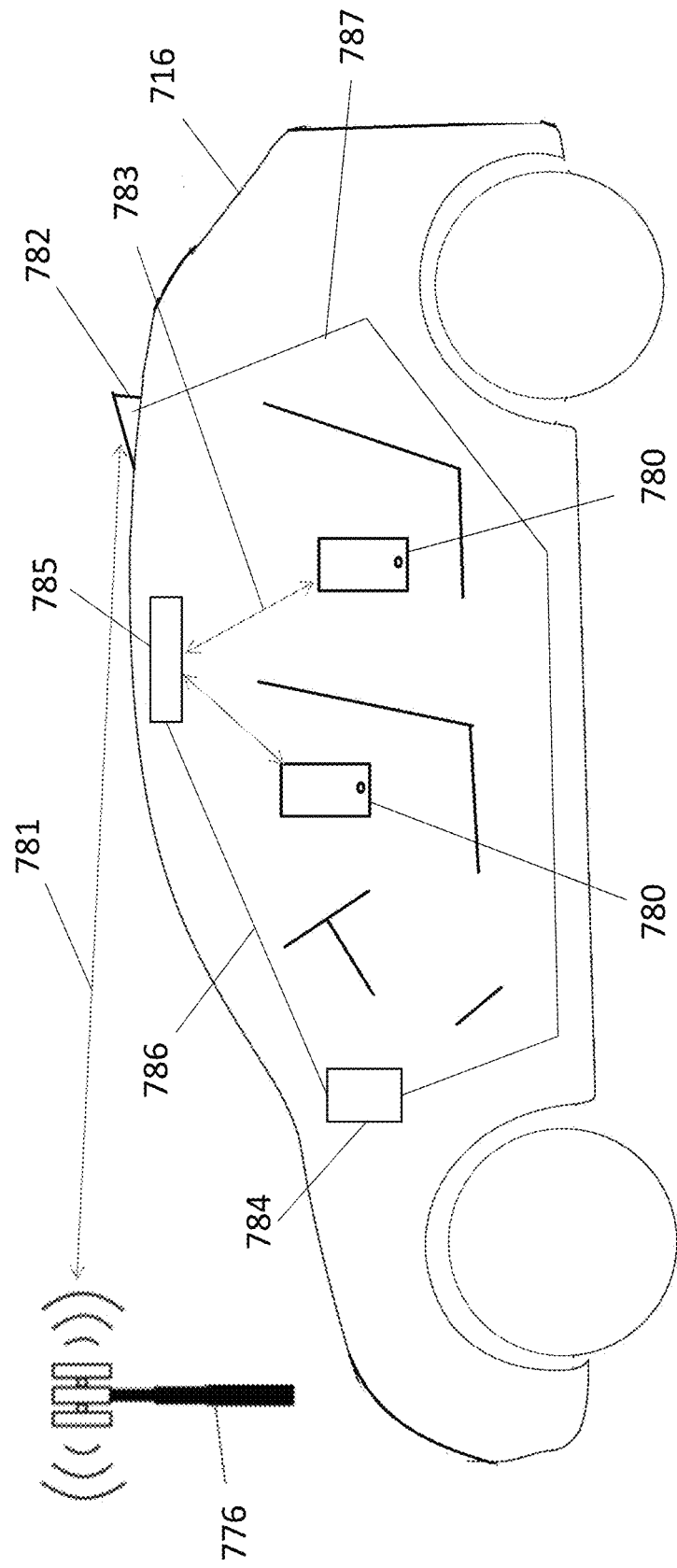
FIG. 11B illustrates an example vehicle including an active antenna with vehicular IAB node RU-MT (Radio Unit Mobile Termination) on the vehicle's rooftop is connected with a vehicular IAB node DU-MT (Distributed Unit with Mobile Termination) inside the vehicle, and an active in-cabin antenna with RU-DU (Radio Unit Distributed Unit) is providing connectivity to UEs inside the vehicle according to an exemplary embodiment.

FIG. 11B illustrates an example vehicle 716 including an active antenna with vehicular IAB node RU-MT (Radio Unit Mobile Termination) 782 of a vehicle integrated access and backhaul (V-IAB) network according to an exemplary embodiment. The active antenna with vehicular IAB node RU-MT 782 is located on the vehicle's rooftop and is in communication with an IAB-donor or upstream IAB node 776 via backhaul F1 over Uu link 781.

The active antenna with vehicular IAB node RU-MT 782 is connected to a vehicular IAB node DU-MT (Distributed Unit with Mobile Termination) 784 via a FH-MT fronthaul link 787 between RU-MT and DU-MT. The vehicular IAB node DU-MT 784 is also connected to an active in-cabin antenna with RU-DU (Radio Unit Distributed Unit) 785 via a FH-DU fronthaul link 786 between DU-MT and RU-DU. The active in-cabin antenna with RU-DU (Radio Unit Distributed Unit) 785 is along a ceiling within the vehicle 716 and operable for providing connectivity to smartphones 780 (broadly, user equipment (UE)) within the vehicle 716 via Uu links 783.

Figure 12:
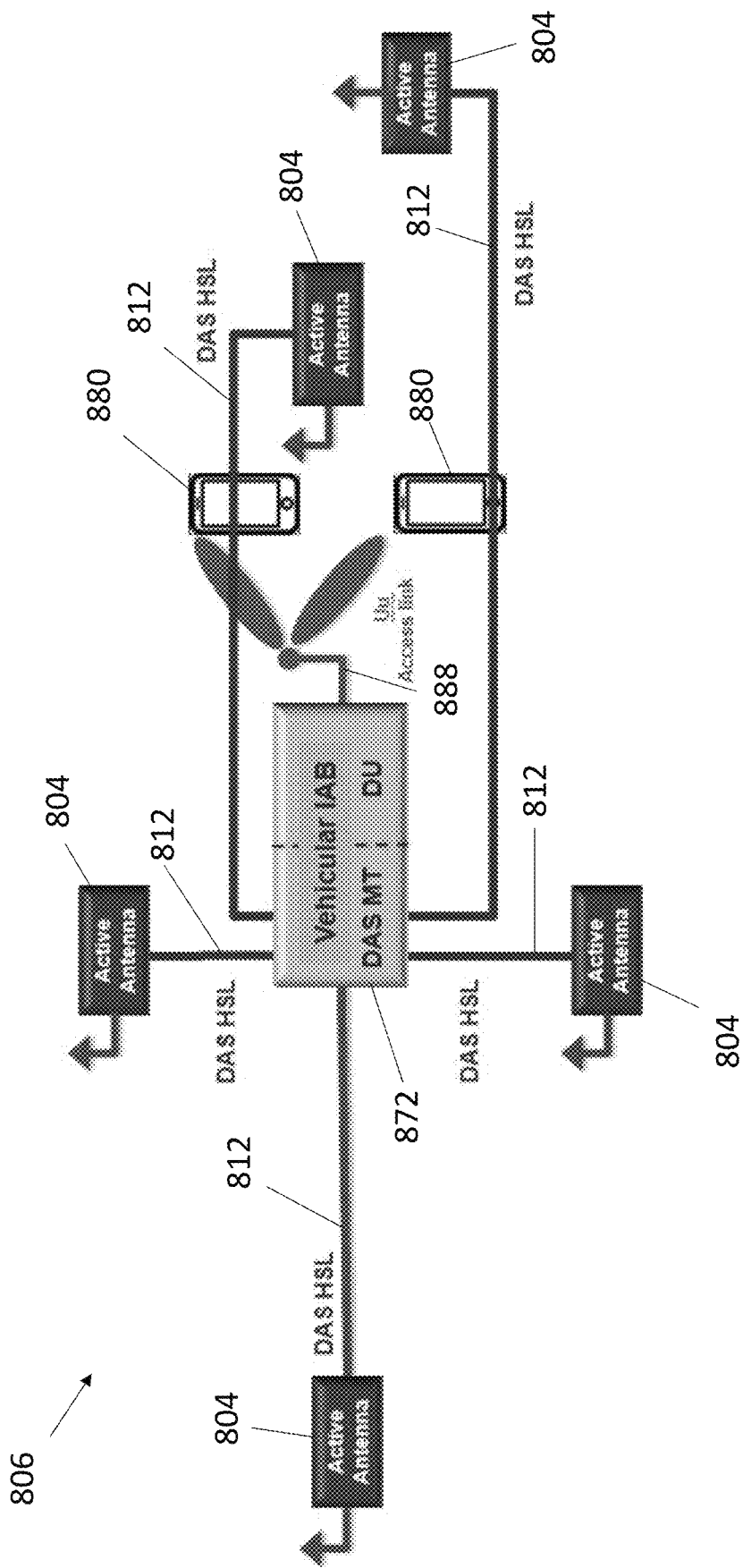
FIG. 12 is a block diagram of a vehicular system including distributed active antennas and a vehicular IAB node of an integrated access and backhaul (V-IAB) network for connecting UEs inside a vehicle according to an exemplary embodiment.

FIG. 12 illustrates an exemplary embodiment of a vehicular system 806 including distributed active antennas 804 and a vehicular IAB node 872 operable for connecting user equipment (UE) 880 inside a vehicle. By way of example, the vehicular IAB node 872 may be part of or included within a central unit of a vehicular distributed antenna system. Or, for example, the vehicular IAB node 872 may be a standalone or separate device that is not part of a central unit of a vehicular distributed antenna system.

The vehicular IAB node 872 may be part of an integrated access and backhaul (V-IAB) network, such as shown in FIG. 9 and described above. The vehicular IAB node 872 is connectible to an IAB-donor (or an upstream IAB-node) via F1*interface running over a wireless backhaul link between the mobile termination (MT) in the vehicular IAB node 872 and an upstream central unit (CU-UP) in the IAB-donor. The IAB-donor is connectible with a core network internet.

The vehicular IAB node 872 is connectible to the user equipment 880 via an FR1 (below 7 GHz) at reduced power level and FR2 Uu Access link 888 between the user equipment 880 and the distributed unit (DU) in the vehicular IAB node 872. The user equipment 880 may comprise one or more of a smartphone, eCall modem IMS (IP Multimedia Subsystem), a network access device (NAD), a personal device, a standard mobile device, etc.

The vehicular IAB node 872 is connectible to the active antennas 804 via high speed links 812. The high speed links 812 may comprise 25 GB-Ethernet digital links or other relatively high bandwidth digital links, e.g., that are suitable for 5G eMBB/URLLC, V2X/RF BW MIMO, 25 GB Automotive Ethernet, etc. In other embodiments, the links 812 may comprise 10 GB-Ethernet digital links or other digital links higher or lower than 10 GB, etc.

The active antennas 804 may be distributed around a vehicle for providing 180/360 degree hemispherical coverage, e.g., including FR1 MIMO, FR2 mmWave, etc. The active antennas 804 shown in FIG. 12 may be identical to the active antenna 104 described above and shown in FIG. 4. In which case, each active antenna 804 may also include an antenna 120 and an active antenna electronic 124 as shown in FIG. 4. The active antenna electronic 124 includes an antenna connectivity 126, as part of the RF front end module (FEM) 128, an analog to digital converter/digital to analog converter (ADC/DAC) 132, IQ Data Compression/Decompression and Time Synchronization module 136 (e.g., algorithms, etc.), and a high speed digital link interface 140 (e.g., 10 GB-Ethernet interface, 25 GB-Ethernet interface, etc.). The RF front end module (FEM) 128 may include a power amplifier for transmission and a low-noise amplifier for reception.

Figure 13:
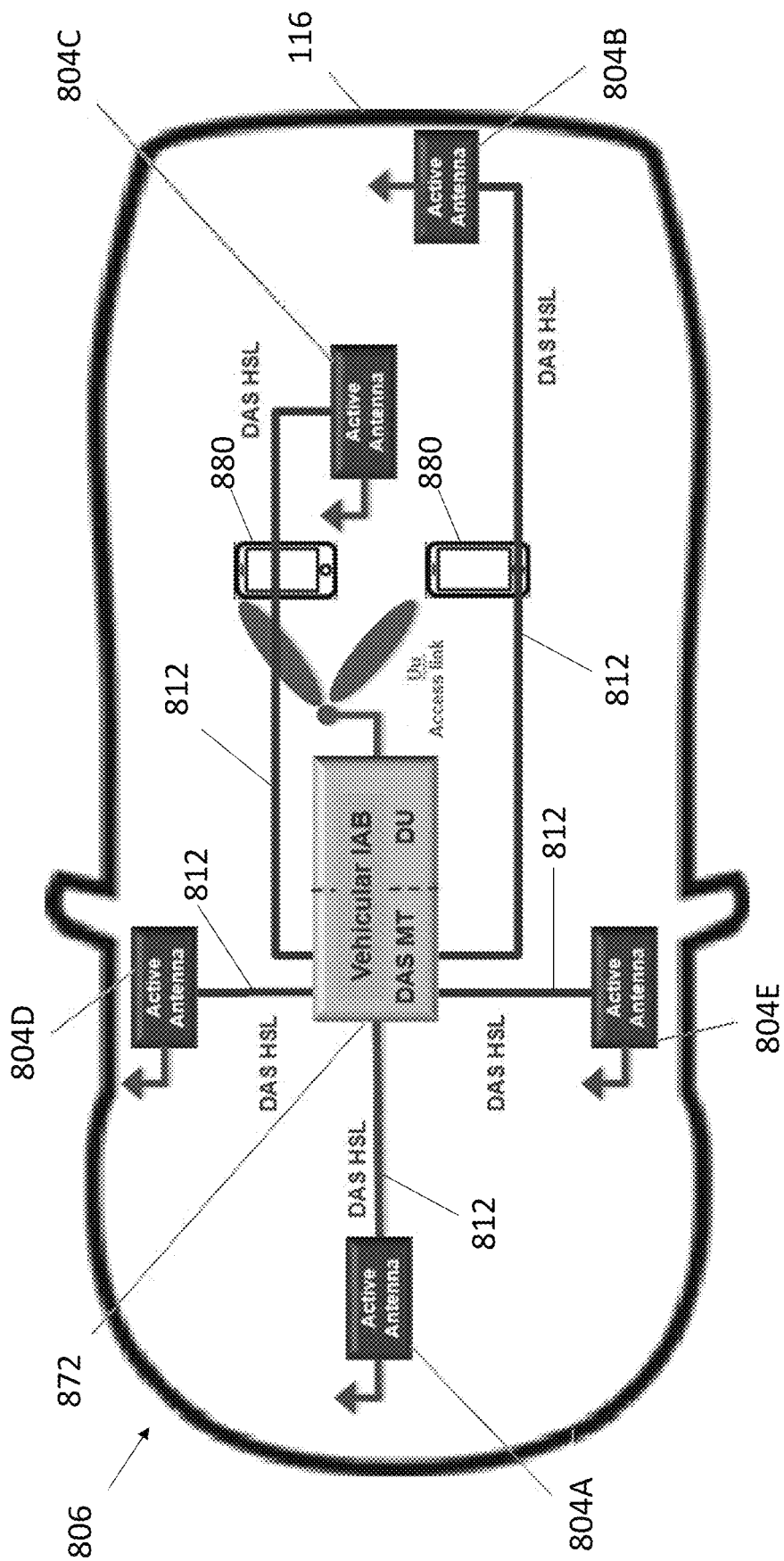
FIG. 13 illustrates the vehicular system shown in FIG. 12 installed within the example vehicle shown in FIG. 2 according to an exemplary embodiment.

FIG. 13 illustrates the vehicular system 806 installed in a vehicle 116, such that the active antennas 804 are spaced apart from each other and distributed around the vehicle 116. More specifically, the active antenna 804A is located towards the front of the vehicle 116, e.g., on the vehicle hood. The active antenna 804B is located towards the back of the vehicle 116, e.g., on the vehicle trunk. The active antenna 804C is located on top of the vehicle 116, e.g., on the vehicle roof. The active antennas 804D and 804E are respectively located along the passenger and driver sides of the vehicle 116, e.g., on the side view mirrors. By distributing the active antennas 804 around the vehicle 116, the vehicular system 806 is operable for providing 180/360 degree hemispherical coverage, e.g., including 5G eMBB/URLLC and V2X/RF BW MIMO, etc.

The vehicular IAB node 872 may be part of a network that is operable for providing 5G URLL and eMBB FR1 (below 7 GHz) via vehicular-IAB backhaul F1*outside the vehicle 116. The network may be operable for providing 5G URLL and eMBB FR1 (below 7 GHz) at reduced power level and FR2 (mmWave) connectivity inside the vehicle 116 for the user equipment 880, including one or more standard mobile devices functioning as a network access device (NAD), eCall-Modem (IMS Version), multiple driver and passenger personal devices, etc.

The relatively low power 5G URLL and eMBB FR2 (mmWave) preferably does not extend outside the vehicle 116 and does not interfere with or couple with any external DAS active antennas. The wireless connectivity provided directly through the IAB node 872 may be usable by standard user equipment, e.g., a standard smartphone without requiring a software upgrade, etc. The network may provide FR1 Best-In-Class-MIMO outside the vehicle to FR2 Large RF Bandwidth inside the vehicle.

Accordingly, disclosed herein are exemplary embodiments of systems including distributed active antennas, adaptive cellphone evolution, and/or vehicular integrated access and backhaul. In exemplary embodiments, a distributed antenna system comprises a central unit onboard a vehicle. The central unit includes a transceiver configured to operate in a cellular network. The central unit also includes an analog to digital converter/digital to analog converter coupled to the transceiver. Four active antennas are onboard the vehicle. Each active antenna includes an analog to digital converter/digital to analog converter and is configured to communicate with the central unit digitally. A link connects each of the active antennas to the central unit. The link is configured to transmit signals digitally while supporting at least 10 Gbps of bandwidth between the central unit and the active antennas.

In exemplary embodiments, the distributed antenna system further comprises a fifth active antenna onboard the vehicle. The fifth active antenna includes an analog to digital converter/digital to analog converter and is configured to communicate with the central unit digitally via the link. The active antennas may be respectively located towards a front, back, a top, a passenger side, and a driver side of the vehicle. The active antennas may be distributed around the vehicle such that the active antennas are operable for providing 180/360 degree hemispherical coverage and/or such that the active antennas are decoupled via a distance of separation of at least ten times the wavelength.

In exemplary embodiments of the distributed antenna system, the link is configured such that each active antenna has a dedicated communication path with the central unit. The link preferably supports at least 10 Gbps of bandwidth between the central unit and each active antenna. For example, the link may support 25 Gbps of bandwidth between the central unit and each active antenna.

In exemplary embodiments of the distributed antenna system, the link comprises a plurality of links. Each link connects a corresponding one of the active antennas to the central unit. Each link is configured to transmit signals digitally. The plurality of links may define a single shared communication network for the active antennas. Or, each link may be dedicated to a communication channel between the corresponding active antenna and the central unit. Each link preferably supports at least 10 Gbps of bandwidth between the central unit and the corresponding one of the active antennas.

In exemplary embodiments of the distributed antenna system, each active antenna comprises an IQ Data Compression/Decompression and Time Synchronization module, a digital link interface, and an RF front end module including a power amplifier for transmission and a low-noise amplifier for reception.

In exemplary embodiments of the distributed antenna system, the central unit comprises a wireless distributed antenna system (DAS) coupler connected to the active antennas via the link. The wireless DAS coupler is configured for connection with a mobile device such that the mobile device is connectible to the active antennas via the wireless DAS coupler and the link. The distributed antenna system may further comprise a wireless charger including the wireless DAS coupler. The wireless charger may be configured such that one or more internal antennas of the wireless DAS coupler are operable for providing wireless vehicular connectivity even while the mobile device is being charged by the wireless charger. The wireless DAS coupler may comprise one or more internal Wi-Fi antennas, a bus interface in communication with the one or more internal Wi-Fi antennas, and a plurality of digital link interfaces connected with the bus interface. Each digital link interface may be connected to a digital link interface of a corresponding one of the active antennas.

In exemplary embodiments of the distributed antenna system, the central unit comprises a mobile device connectible to the link and operable for switching from one or more internal antennas of the mobile device to the active antennas of the distributed antenna system, whereby the mobile device is operable as a network access device for the active antennas of the distributed antenna system. The mobile device may comprise one or more internal Wi-Fi antennas and a bus interface in communication with the one or more internal Wi-Fi antennas. The mobile device may further comprise an IQ data compression/decompression and synchronization module in communication with the bus interface, and an IQ data switch in communication with the IQ data compression/decompression and synchronization module. The mobile device may also comprise a baseband modem in communication with the IQ data switch, and one or more internal MIMO antennas in communication with the IQ data switch. Additionally, the mobile device may comprise an RF front end module and analog to digital converter/digital to analog converter between the IQ data switch and each of the one or more internal MIMO antennas.

In exemplary embodiments, a vehicular system comprises a distributed antenna system as disclosed herein. The vehicular system also comprise a vehicular integrated access and backhaul (IAB) node onboard the vehicle. The vehicular IAB node is operable with an integrated access and backhaul (V-IAB) network for providing wireless connectivity for user equipment inside the vehicle. The vehicular IAB node may be part of or included within the central unit of the distributed antenna system. Or, the vehicular IAB node may be separate from the central unit of the distributed antenna system.

In exemplary embodiments of the vehicular system, the vehicular IAB node is connectible to an upstream IAB node via an interface running over a wireless backhaul link between a mobile termination in the vehicular IAB node and an upstream central unit in the upstream IAB node that is connected with a core network internet.

In exemplary embodiments of the vehicular system, the vehicular IAB node includes a distributed unit and is connectible to user equipment via an interface between the user equipment and the distributed unit in the vehicular IAB node.

In exemplary embodiments of the vehicular system, the vehicular system is operable for providing wireless connectivity for user equipment inside the vehicle that does not extend outside the vehicle and/or that does not interfere with or couple with any active antenna of the distributed antenna system.

In exemplary embodiments of the vehicular system, the vehicular IAB node comprises a vehicular IAB node including a combined radio unit and distributed unit. Or, the vehicular IAB node comprises a split vehicular IAB node including a radio unit and a distributed unit separated from each other and connected via a digital link.

In exemplary embodiments of the vehicular system, an active antenna includes a vehicular IAB node Radio Mobile Unit Termination (RU-MT) and is connectible to an upstream IAB node via an interface running over a wireless backhaul link. The active antenna with the vehicular IAB node RU-MT is connected to a vehicular IAB node Distributed Unit with Mobile Termination (DU-MT) via a fronthaul link. The vehicular IAB node DU-MT is connected to an active in-cabin antenna with Radio Unit Distributed Unit (RU-DU) via a fronthaul link. The active in-cabin antenna onboard the vehicle is operable for providing wireless connectivity to user equipment inside the vehicle.

In exemplary embodiments, a vehicular system comprises a vehicular integrated access and backhaul (IAB) node onboard a vehicle. The vehicle IAB node is operable with an integrated access and backhaul (V-IAB) network for providing wireless connectivity for user equipment inside the vehicle. The vehicular IAB node may be connectible to an upstream IAB node via an interface running over a wireless backhaul link between a mobile termination in the vehicular IAB node and an upstream central unit in the upstream IAB node that is connected with a core network internet. The vehicular IAB node may include a distributed unit and be connectible to user equipment via an interface between the user equipment and the distributed unit in the vehicular IAB node.

In exemplary embodiments of the vehicular system, the vehicular IAB node comprises a vehicular IAB node including a combined radio unit and distributed unit. Or, the vehicular IAB node comprises a split vehicular IAB node including a radio unit and a distributed unit separated from each other and connected via a digital link.

In exemplary embodiments of the vehicular system, an active antenna includes a vehicular IAB node Radio Mobile Unit Termination (RU-MT) and is connectible to an upstream IAB node via an interface running over a wireless backhaul link. The active antenna with the vehicular IAB node RU-MT is connected to a vehicular IAB node Distributed Unit with Mobile Termination (DU-MT) via a fronthaul link. The vehicular IAB node DU-MT is connected to an active in-cabin antenna with Radio Unit Distributed Unit (RU-DU) via a fronthaul link. The active in-cabin antenna onboard the vehicle is operable for providing wireless connectivity to user equipment inside the vehicle.

In exemplary embodiments, the vehicular system comprises a central unit onboard the vehicle and one or more active antennas are onboard the vehicle. The one or more active antennas are configured to communicate with the central unit digitally. A link connects the one or more active antennas to the central unit. The link is configured to transmit signals digitally. The vehicular IAB node may be part of or included within the central unit. Or, the vehicular IAB node may be separate from the central unit. The vehicular system may be operable for providing wireless connectivity for user equipment inside the vehicle that does not extend outside the vehicle and/or that does not interfere with or couple with any of the one or more active antennas. The one or more active antennas may comprise: five active antennas respectively located towards a front, a back, a top, a passenger side, and a driver side of the vehicle; and/or a plurality of active antennas distributed around the vehicle such that the active antennas is operable for providing 180/360 degree hemispherical coverage and/or such that the active antennas are decoupled via a distance of separation of at least ten times the wavelength.

In exemplary embodiments, a vehicular system comprises a central unit onboard a vehicle and one or more active antennas onboard the vehicle. The one or more active antennas are configured to communicate with the central unit digitally. A link connects the one or more active antennas to the central unit. The link is configured to transmit signals digitally. The central unit may comprise a wireless distributed antenna system (DAS) coupler connected to the one or more active antennas via the link. The wireless DAS coupler may be configured for connection with a mobile device such that the mobile device is connectible to the one or more active antennas via the wireless DAS coupler and the link. Additionally, or alternatively, the central unit may comprise a mobile device connectible to the link and operable for switching from one or more internal antennas of the mobile device to the one or more active antennas onboard the vehicle, whereby the mobile device is operable as a network access device for the one or more active antennas onboard the vehicle.

In exemplary embodiments, the vehicular system further comprises a wireless charger including the wireless DAS coupler. The wireless charger is configured such that one or more internal antennas of the wireless DAS coupler are operable for providing wireless vehicular connectivity even while the mobile device is being charged by the wireless charger.

In exemplary embodiments of the vehicular system, the wireless DAS coupler comprises one or more internal Wi-Fi antennas, a bus interface in communication with the one or more internal Wi-Fi antennas, and one or more digital link interfaces connected with the bus interface. Each digital link interface is connected to a digital link interface of a corresponding one of the one or more active antennas.

In exemplary embodiments of the vehicular system, the central unit comprises the mobile device including one or more internal Wi-Fi antennas and a bus interface in communication with the one or more internal Wi-Fi antennas. The mobile device further includes an IQ data compression/decompression and synchronization module in communication with the bus interface, and an IQ data switch in communication with the IQ data compression/decompression and synchronization module. The mobile device also includes a baseband modem in communication with the IQ data switch, and one or more internal MIMO antennas in communication with the IQ data switch. Additionally, the mobile device includes an RF front end module and analog to digital converter/digital to analog converter between the IQ data switch and each of the one or more internal MIMO antennas.

In exemplary embodiments of the vehicular system, the one or more active antennas comprise: five active antennas respectively located towards a front, a back, a top, a passenger side, and a driver side of the vehicle; and/or a plurality of active antennas distributed around the vehicle such that the active antennas is operable for providing 180/360 degree hemispherical coverage and/or such that the active antennas are decoupled via a distance of separation of at least ten times the wavelength.

In exemplary embodiments, the vehicular system further comprises a vehicular integrated access and backhaul (IAB) node onboard the vehicle and operable with an integrated access and backhaul (V-IAB) network for providing wireless connectivity for user equipment inside the vehicle. The vehicular IAB node may be part of or included within the central unit. Or, the vehicular IAB node may be separate from the central unit.

The disclosed exemplary embodiments of the vehicular systems including distributed active antennas, adaptive cellphone evolution, and/or vehicular integrated access and backhaul may be used with a wide range of mobile platforms, including automobiles, buses, trains, boats, among other mobile platforms. Accordingly, the references to vehicle or car herein should not be construed as limiting the scope of the present disclosure to any specific type of mobile platform. In addition, exemplary embodiments disclosed herein should also not be limited to only the frequency bands disclosed herein (e.g., WiGig, 60 GHz Wi-Fi frequencies, 5G eMBB/URLLC, V2X/RF BW MIMO, etc.) as other exemplary embodiments may be configured for use with other frequency band(s).

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

The invention claimed is:

1. A distributed antenna system for a vehicle, comprising:
a central unit onboard the vehicle, the central unit including a transceiver configured to operate in a cellular network, the central unit including an analog to digital converter/digital to analog converter coupled to the transceiver;
four active antennas onboard the vehicle, each active antenna including an analog to digital converter/digital to analog converter and configured to communicate with the central unit digitally; and
a link comprising a plurality of links connecting each of the active antennas to the central unit and configured to transmit signals digitally, each link supporting at least 10 Gbps of bandwidth between the central unit and the active antennas.

2. The distributed antenna system of claim 1, further comprising a fifth active antenna onboard the vehicle, the fifth active antenna including an analog to digital converter/digital to analog converter and configured to communicate with the central unit digitally via the link.

3. The distributed antenna system of claim 2, wherein:
at least one of the active antennas is located towards a front of the vehicle;
at least one of the active antennas is located towards a back of the vehicle;
at least one of the active antennas is located on top of the vehicle;
at least one of the active antennas is located along a passenger side of the vehicle; and
at least one of the active antennas is located along a driver side of the vehicle.

4. The distributed antenna system of claim 1, wherein the link is configured such that each active antenna has a dedicated communication path with the central unit.

5. The distributed antenna system of claim 1, wherein the link supports at least 10 Gbps of bandwidth between the central unit and each active antenna.

6. The distributed antenna system of claim 1, wherein the link supports at least 25 Gbps of bandwidth between the central unit and each active antenna.

7. The distributed antenna system of claim 1, wherein:
the plurality of links define a single shared communication network for the active antennas;
or each link is dedicated to a communication channel between the corresponding active antenna and the central unit.

8. The distributed antenna system of claim 1, wherein the active antennas are distributed around the vehicle such that the active antennas are operable for providing 180/360 degree hemispherical coverage and/or such that the active antennas are decoupled via a distance of separation of at least ten times a wavelength of the active antennas.

9. The distributed antenna system of claim 1, wherein each active antenna comprises an in-phase and quadrature (IQ) Data Compression/Decompression and Time Synchronization module, a digital link interface, and a radio-frequency (RF) front end module including a power amplifier for transmission and a low-noise amplifier for reception.

10. The distributed antenna system of claim 1, wherein the central unit comprises a wireless distributed antenna system (DAS) coupler connected to the active antennas via the link, the wireless DAS coupler configured for connection with a user equipment such that the user equipment is connectible to the active antennas via the wireless DAS coupler and the link.

11. The distributed antenna system of claim 10, further comprising a wireless charger including the wireless DAS coupler and configured such that one or more internal antennas of the wireless DAS coupler are operable for providing wireless vehicular connectivity even while the user equipment is being charged by the wireless charger.

12. The distributed antenna system of claim 10, wherein the wireless DAS coupler comprises one or more internal Wi-Fi antennas, a bus interface in communication with the one or more internal Wi-Fi antennas, and a plurality of digital link interfaces connected with the bus interface, each digital link interface connected to a digital link interface of a corresponding one of the active antennas.

13. The distributed antenna system of claim 1, wherein the central unit comprises a user equipment connectible to the link and operable for switching from one or more internal antennas of the user equipment to the active antennas of the distributed antenna system, whereby the user equipment is operable as a network access device for the active antennas of the distributed antenna system.

14. The distributed antenna system of claim 13, wherein the user equipment comprises:
one or more internal Wi-Fi antennas;
a bus interface in communication with the one or more internal Wi-Fi antennas;
an in-phase and quadrature (IQ) data compression/decompression and synchronization module in communication with the bus interface;
an IQ data switch in communication with the IQ data compression/decompression and synchronization module;
a baseband modem in communication with the IQ data switch;
one or more internal multiple input multiple output (MIMO) antennas in communication with the IQ data switch; and
a radio-frequency (RF) front end module and analog to digital converter/digital to analog converter between the IQ data switch and each of the one or more internal MIMO antennas.

15. A vehicular communication system comprising the distributed antenna system of claim 1 and a vehicular integrated access and backhaul (IAB) node onboard the vehicle and operable with an integrated access and backhaul (V-IAB) network for providing wireless connectivity for user equipment inside the vehicle, wherein:
the vehicular IAB node is integrated with the central unit of the distributed antenna system; or
the vehicular IAB node is separate from the central unit of the distributed antenna system.

16. The vehicular communication system of claim 15, wherein the vehicular IAB node is configured to communicate with an upstream IAB node via an interface running over a wireless backhaul link.

17. The vehicular communication system of claim 15, wherein the vehicular IAB node includes a distributed unit and is configured to communicate with the user equipment via an interface between the user equipment and the distributed unit in the vehicular IAB node.

18. The vehicular communication system of claim 15, wherein the vehicular communication system is operable for providing wireless connectivity for the user equipment inside the vehicle that does not extend outside the vehicle and/or that does not interfere with or couple with any active antenna of the distributed antenna system.

19. The vehicular communication system of claim 15, wherein:
the vehicular IAB node comprises a vehicular IAB node including a combined radio unit and distributed unit; or
the vehicular IAB node comprises a split vehicular IAB node including a radio unit and a distributed unit separated from each other and connected via a digital link.

20. The vehicular communication system of claim 15, wherein:
at least one of the active antennas of the distributed antenna system includes a vehicular IAB node Radio Unit Mobile Termination (RU-MT) and is configured to communicate with an upstream IAB node via a wireless backhaul link;
the at least one active antenna with the vehicular IAB node RU-MT is connected to a vehicular IAB node Distributed Unit with Mobile Termination (DU-MT) via a fronthaul link;
the vehicular IAB node DU-MT is connected to an active in-cabin antenna with Radio Unit Distributed Unit (RU-DU) via a fronthaul link; and
the active in-cabin antenna onboard the vehicle is operable for providing wireless connectivity to the user equipment inside the vehicle.

21. A vehicular communication system comprising:
a central unit onboard a vehicle;
one or more active antennas onboard the vehicle and configured to communicate with the central unit digitally;
a link connecting the one or more active antennas to the central unit and configured to transmit signals digitally;
a vehicular integrated access and backhaul (IAB) node integrated with the central unit and operable with an integrated access and backhaul (V-IAB) network for providing wireless connectivity for user equipment inside the vehicle, wherein:
the vehicular IAB node includes a combined IAB node or a split IAB node, the combined IAB node including a combined radio unit and distributed unit, the split IAB node including a radio unit and a distributed unit separated from each other and connected via a digital link;

the vehicular IAB node is configured to communicate with an upstream IAB node via a wireless backhaul link; and/or the vehicular IAB node includes a distributed unit and is configured to communicate with the user equipment via an interface between the user equipment and the distributed unit in the vehicular IAB node.

22. The vehicular communication system of claim 21, wherein:

at least one of the one or more active antennas includes a vehicular IAB node Radio Mobile Unit Termination (RU-MT) and is configured to communicate with the upstream IAB node via the wireless backhaul link;

the at least one of the one or more active antennas with the vehicular IAB node RU-MT is connected to a vehicular IAB node Distributed Unit with Mobile Termination (DU-MT) via a fronthaul link;

the vehicular IAB node DU-MT is connected to an active in-cabin antenna with Radio Unit Distributed Unit (RU-DU) via a fronthaul link; and the active in-cabin antenna onboard the vehicle is operable for providing wireless connectivity to user equipment inside the vehicle.

23. The vehicular communication system of claim 21, wherein the vehicular system is operable for providing wireless connectivity for user equipment inside the vehicle that does not extend outside the vehicle and/or that does not interfere with or couple with any of the one or more active antennas.

24. The vehicular communication system of claim 21, wherein the one or more active antennas comprise:

five active antennas respectively located towards a front, a back, a top, a passenger side, and a driver side of the vehicle; and/or a plurality of active antennas distributed around the vehicle such that the active antennas are operable for providing 180/360 degree hemispherical coverage and/or such that the active antennas are decoupled via a distance of separation of at least ten times a wavelength of the active antennas.

25. A vehicular communication system comprising:

a central unit onboard a vehicle;

one or more active antennas onboard the vehicle and configured to communicate with the central unit digitally; and a link connecting the one or more active antennas to the central unit and configured to transmit signals digitally;

wherein:

the central unit comprises a wireless distributed antenna system (DAS) coupler connected to the one or more active antennas via the link, the wireless DAS coupler configured for connection with a user equipment such that the user equipment is connectible to the one or more active antennas via the wireless DAS coupler and the link; and/or the central unit comprises the user equipment connectible to the link and operable for switching from one or more internal antennas of the user equipment to the one or more active antennas onboard the vehicle, whereby the user equipment is operable as a network access device for the one or more active antennas onboard the vehicle.

26. The vehicular communication system of claim 25, further comprising a wireless charger including the wireless DAS coupler and configured such that one or more internal antennas of the wireless DAS coupler are operable for providing wireless vehicular connectivity even while the user equipment is being charged by the wireless charger.

27. The vehicular communication system of claim 25, wherein the wireless DAS coupler comprises one or more internal Wi-Fi antennas, a bus interface in communication with the one or more internal Wi-Fi antennas, and one or more digital link interfaces connected with the bus interface, each digital link interface connected to a digital link interface of a corresponding one of the one or more active antennas.

28. The vehicular communication system of claim 25, wherein the central unit comprises the user equipment including:

one or more internal Wi-Fi antennas;

a bus interface in communication with the one or more internal Wi-Fi antennas;

an in-phase and quadrature (IQ) data compression/decompression and synchronization module in communication with the bus interface;

an IQ data switch in communication with the IQ data compression/decompression and synchronization module;

a baseband modem in communication with the IQ data switch;

one or more internal multiple input multiple output (MIMO) antennas in communication with the IQ data switch; and a radio frequency (RF) front end module and analog to digital converter/digital to analog converter between the IQ data switch and each of the one or more internal MIMO antennas.

29. The vehicular communication system of claim 25, wherein the one or more active antennas comprise:

five active antennas respectively located towards a front, a back, a top, a passenger side, and a driver side of the vehicle; and/or a plurality of active antennas distributed around the vehicle such that the active antennas is operable for providing 180/360 degree hemispherical coverage and/or such that the active antennas are decoupled via a distance of separation of at least ten times a wavelength of the active antennas.

30. The vehicular communication system of claim 25, further comprising a vehicular integrated access and backhaul (IAB) node onboard the vehicle and operable with an integrated access and backhaul (V-IAB) network for providing wireless connectivity for the user equipment inside the vehicle, wherein:

the vehicular IAB node is part of or included within the central unit; or the vehicular IAB node is separate from the central unit.

\* \* \* \* \*